United States Patent [19]
Stebnicki et al.

[11] Patent Number: 5,960,937
[45] Date of Patent: Oct. 5, 1999

[54] CONVEYOR WITH HINGE PIN RETENTION PLUG WITH SNAP FIT

[75] Inventors: James C. Stebnicki, Shorewood; Paul Koeferl, Germantown, both of Wis.

[73] Assignee: Rexnord Corporation, Milwaukee, Wis.

[21] Appl. No.: 08/958,115

[22] Filed: Oct. 27, 1997

[51] Int. Cl.$^6$ ................................................. B65G 17/06
[52] U.S. Cl. ........................ 198/851; 198/852; 198/853
[58] Field of Search ................................. 198/853, 852, 198/851; 998/851, 852, 853

[56] References Cited

U.S. PATENT DOCUMENTS

| | | | |
|---|---|---|---|
| 5,096,053 | 3/1992 | Hodlewsky | 198/853 |
| 5,125,504 | 6/1992 | Corlett et al. | 198/853 X |
| 5,293,989 | 3/1994 | Garbagnati | 198/853 |
| 5,662,211 | 9/1997 | Quentin | 198/853 |

*Primary Examiner*—William E. Terrell
*Assistant Examiner*—Kenneth W. Bower
*Attorney, Agent, or Firm*—Michael Best & Friedrich LLP

[57] ABSTRACT

Disclosed herein is a conveyor having an intended direction of travel and comprising a link module extending transversely of the intended direction of conveyor travel and comprising a plurality of ears including a laterally located outer side ear having a bore extending transversely of the direction of intended conveyor travel, and a pair of gripping surfaces extending in spaced parallel relation to each other to define a gripping portion extending along the direction of intended conveyor travel, and a plug fabricated of resilient material and including a cylindrical barrel portion extending in said bore, and spaced surfaces extending parallel to and inwardly of said outer side surface to define a notch resiliently engaging said gripping portion of said outer side ear.

23 Claims, 2 Drawing Sheets

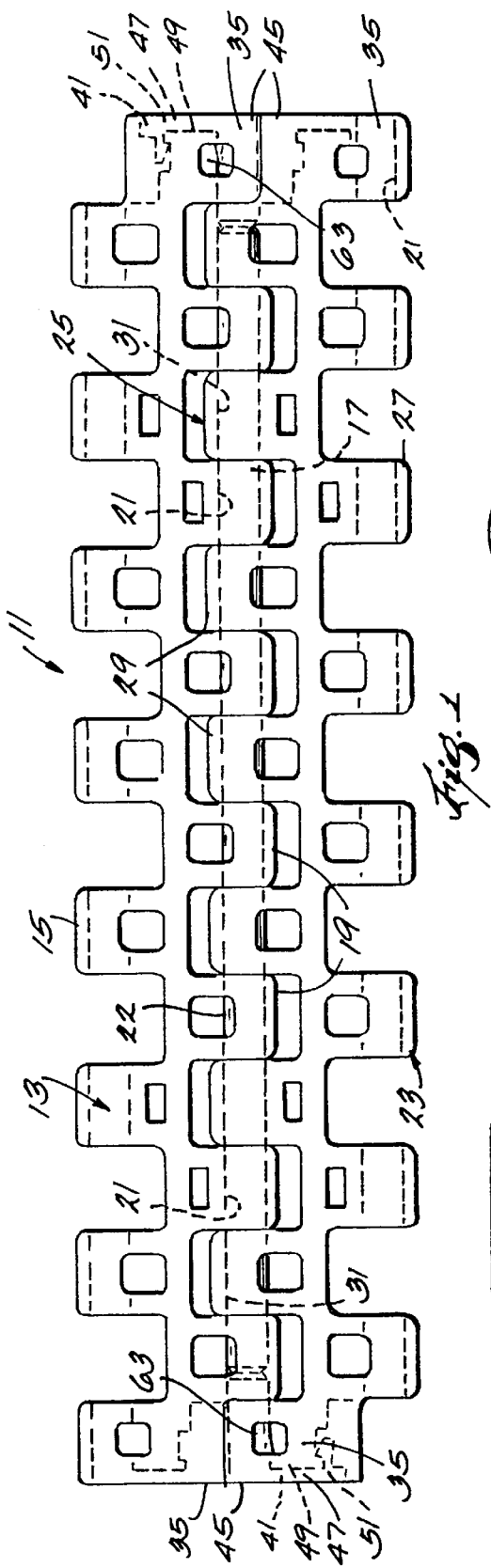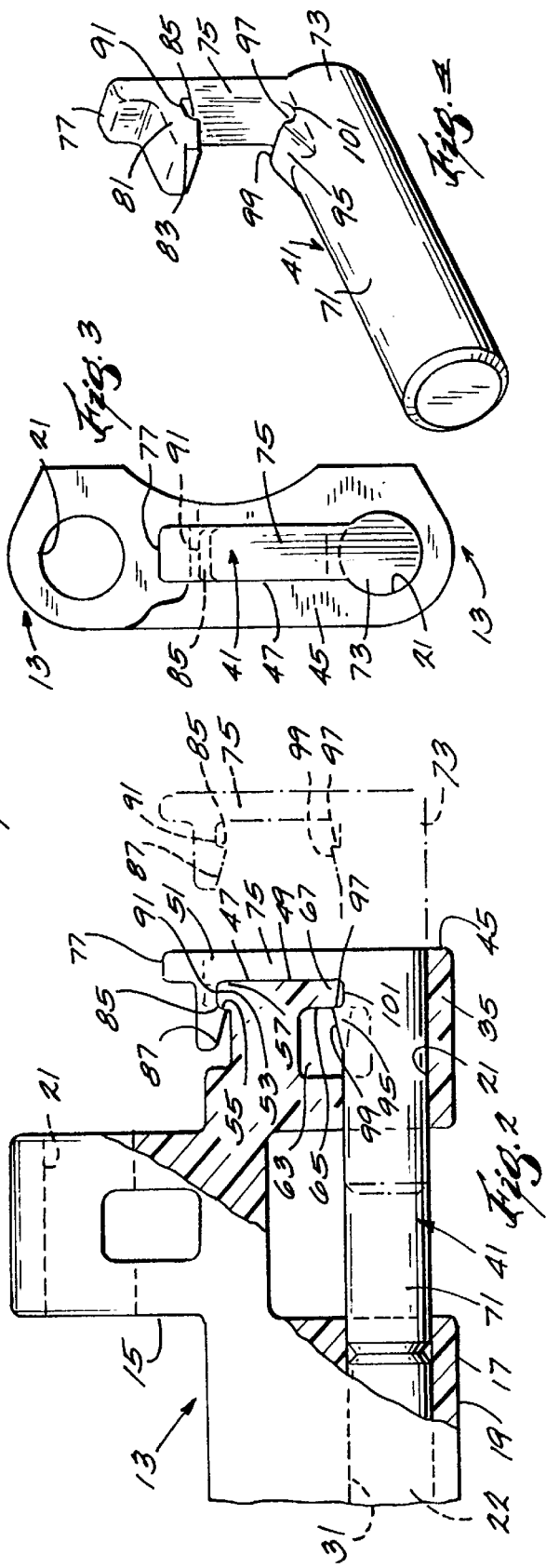

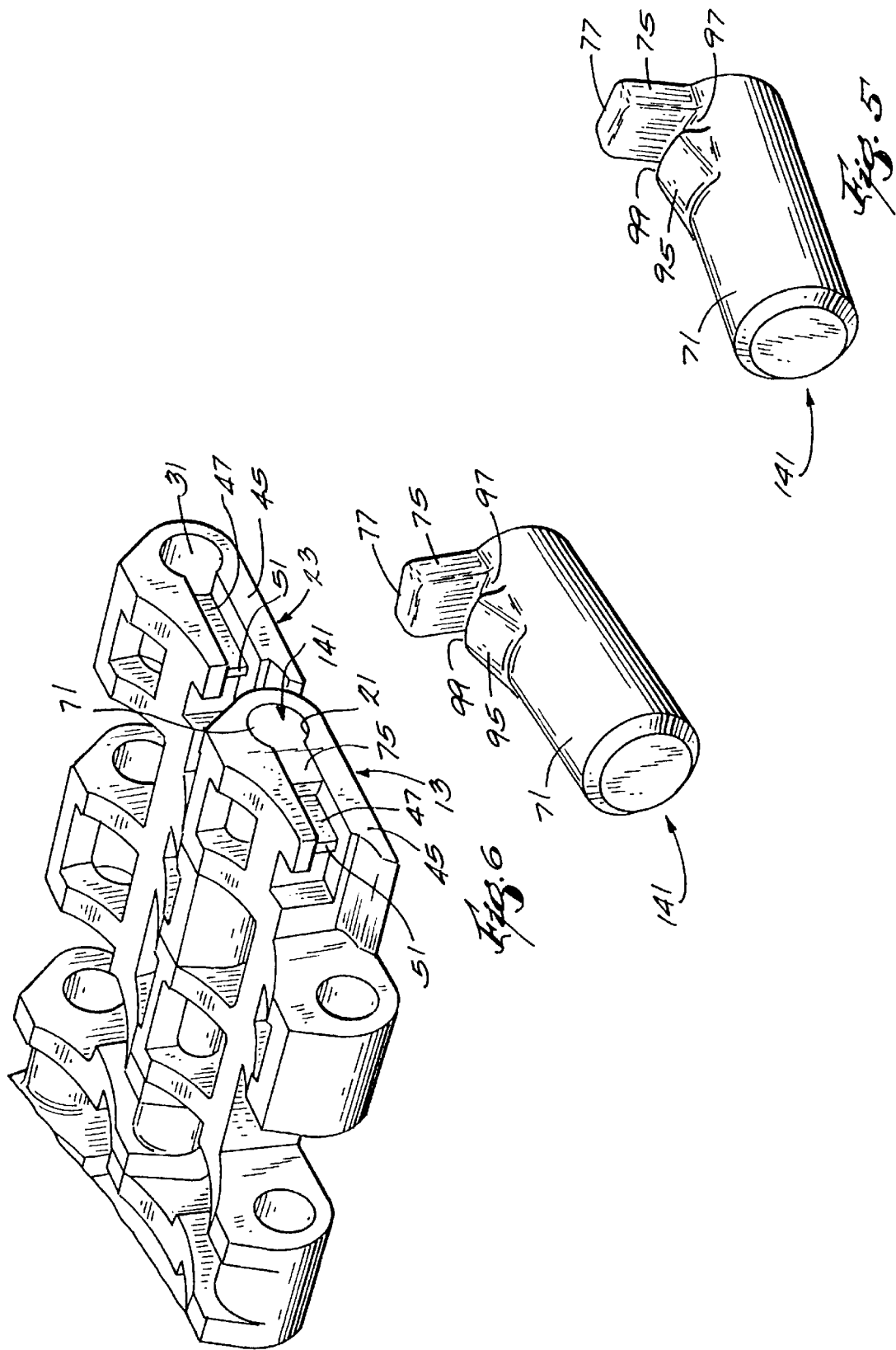

CONVEYOR WITH HINGE PIN RETENTION PLUG WITH SNAP FIT

BACKGROUND OF THE INVENTION

The invention relates generally to conveyors or chains or modular belting or the like, and, more particularly, to conveyors or chains including a plurality of link modules serially connected together by a plurality of hinge pins. The invention also relates to plugs for retaining such hinge pins in a conveyor chain or modular belting.

In the past, some chains or conveyors used snap fit plugs in connection with MatTop® chains manufactured by Rexnord Corporation. Others have manufactured hinge pins which included an end diameter which was larger than the root diameter of the hinge pin and which provided an internal snap fit between the hinge pin and the associated link module.

SUMMARY OF THE INVENTION

The invention provides a conveyor having an intended direction of travel and comprising a first link module extending transversely of the intended direction of conveyor travel and including a trailing portion including a plurality of spaced apart ears defining therebetween a first series of spaces, and a second link module extending transversely of the intended direction of conveyor travel and including a leading portion including a plurality of spaced apart ears located in the spaces defined by the plurality of ears of the trailing portion of the first link module, one of the leading and trailing plurality of ears including a laterally located outer side ear having an outer side surface extending along the direction of intended conveyor travel, and a bore extending from the outer side surface transversely of the direction of intended conveyor travel, a retention plug including a cylindrical barrel portion extending in the bore and including an outer end, and interengaging surfaces on the plug and on the outer side ear for releasably preventing outward withdrawal of the plug from the bore.

The invention also provides a conveyor having an intended direction of travel and comprising a link module extending transversely of the intended direction of conveyor travel and comprising a plurality of ears including a laterally located outer side ear having a bore extending transversely of the direction of intended conveyor travel, and a pair of gripping surfaces extending in spaced parallel relation to each other to define a gripping portion extending along the direction of intended conveyor travel, and a retention plug fabricated of resilient material and including a cylindrical barrel portion extending in the bore, and spaced surfaces extending parallel to and inwardly of the outer side surface to define a notch resiliently engaging the gripping portion of the outer side ear.

The invention also provides a conveyor having an intended direction of travel and comprising a first link module extending transversely of the intended direction of conveyor travel and including a trailing portion including a plurality of ears spaced apart at distances to define therebetween a first series of spaces, and a second link module extending transversely of the intended direction of conveyor travel and including a leading portion including a plurality of ears spaced apart at distances to define therebetween a second series of spaces and located in the spaces defined by the plurality of ears of the trailing portion of the first link module, and one of the leading and trailing plurality of ears including a laterally located outer side ear having an outer side surface extending along the direction of intended conveyor travel, a bore extending from the outer side surface transversely of the direction of intended conveyor travel, a recess located in the outer side surface and extending radially from the bore along the direction of intended conveyor travel, and an aperture extending in the outer side ear transversely to the bore, communicating with the bore, and defined, in part, by an abutment surface spaced inwardly from the outer side surface and extending along the direction of intended conveyor travel, and a retention plug including a cylindrical barrel portion extending in the bore and including an outer end, a flange portion extending from the outer end of the barrel portion and located in the recess in the outer side surface of the end ear, and a resilient tab portion extending radially from the barrel portion in inwardly spaced relation from the flange portion and in engagement with the abutment surface of the outer side ear.

The invention also provides a conveyor having an intended direction of travel and comprising a first link module extending transversely of the intended direction of conveyor travel and including a trailing portion including a plurality of ears spaced apart at distances to define therebetween a first series of spaces, and a second link module extending transversely of the intended direction of conveyor travel and including a leading portion including a plurality of ears spaced apart at distances to define therebetween a second series of spaces and located in the spaces defined by the plurality of ears of the trailing portion of the first link module, and one of the leading and trailing plurality of ears including a laterally located outer side ear having an outer side surface extending along the direction of intended conveyor travel, a bore extending from the outer side surface transversely of the direction of intended conveyor travel, a recess located in the outer side surface, extending radially from the bore along the direction of intended conveyor travel, and defined, in part, by a recessed surface extending radially from the bore and parallel to the outer side surface and having an end spaced from the bore, an edge surface extending from the end of the recessed surface and parallel to the bore, a gripping surface extending parallel to the recessed surface and from the edge surface to define, with the recessed surface and the edge surface, a gripping portion projecting away from the bore, and a retention plug including a cylindrical barrel portion extending in the bore and including an outer end, a flange portion extending from the outer end of the barrel portion, located in the recess in the outer side surface of the outer side ear, and including an outer end spaced from the barrel portion, and an arm portion extending from the flange portion inwardly of the outer end thereof and in parallel relation to the barrel portion, and including an outer enlarged portion projecting toward the barrel portion and defining, between the flange portion and the arm portion, a notch resiliently engaging the gripping portion of the outer side ear.

The invention also provides a conveyor having an intended direction of travel and comprising a first link module extending transversely of the intended direction of conveyor travel and including a trailing portion including a plurality of ears spaced apart at distances to define therebetween a first series of spaces, and a second link module extending transversely of the intended direction of conveyor travel and including a leading portion including a plurality of ears spaced apart at distances to define therebetween a second series of spaces and located in the spaces defined by the plurality of ears of the trailing portion of the first link module, and one of the leading and trailing plurality of ears including a laterally located outer side ear having an outer side surface extending along the direction of intended conveyor travel, a bore extending from the outer side surface transversely of the direction of intended conveyor travel, a recess located in the outer side surface, extending radially from the bore along the direction of intended conveyor travel, and defined, in part, by a recessed surface extending radially from the bore and parallel to the outer side surface and having an end spaced from the bore, an edge surface extending from the end of the recessed surface and parallel to the bore, a first gripping surface extending parallel to the recessed surface and from the edge surface to define, with the recessed surface and the edge surface, a gripping portion projecting away from the bore, and an aperture extending in the outer side ear transversely to the bore, communicating with the bore, and defined, in part, by a second gripping surface spaced inwardly from and parallel to the outer side surface to define, with the recessed surface, a second gripping portion projecting toward the bore, and a retention plug including a cylindrical barrel portion extending in the bore and including an outer end, a flange portion extending from the outer end of the barrel portion, located in the recess in the outer side surface of the end ear, and including an outer end spaced from the barrel portion, an arm portion extending from the flange portion inwardly of the outer end thereof and in parallel relation to the barrel portion, and including an outer enlarged portion projecting toward the barrel portion and defining, between the flange portion and the arm portion, a first notch resiliently engaging the first gripping portion of the outer side ear, and a tab portion extending radially from the barrel portion in inwardly spaced relation from the flange portion and defining with the flange portion, a second notch resiliently engaging the second gripping portion of the outer ear.

Other features and advantages of the invention will become apparent to those skilled in the art upon review of the following detailed description, claims and drawings.

DESCRIPTION OF THE DRAWINGS

FIG. 1 is a top plan view of a portion of a conveyor incorporating various of the features of the invention.

FIG. 2 is an enlarged, and partially broken away, top plan view of an end portion of one of the link modules of the conveyor shown in FIG. 1 and with the other link module omitted.

FIG. 3 is a partially broken end view, taken from the right in FIG. 2.

FIG. 4 is a perspective view of a retention plug employed in the conveyor shown in FIG. 1.

FIG. 5 is a perspective view of another retention plug which can be employed in the conveyor shown in FIG. 1.

FIG. 6 is a perspective view, from the bottom and side, of the conveyor which is shown generally in FIG. 1 and which is in assembled relation with the retention plug shown in FIG. 5.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in the drawings is a first embodiment of a conveyor 11 having an intended direction of travel and comprising a plurality of generally identical link modules serially connected together by a plurality of hinge pins. More particularly, the conveyor 11 includes a first link module 13 extending transversely of the intended direction of conveyor travel and including a leading portion 15 and a trailing portion 17 including a plurality of spaced apart ears 19 respectively including therein transversely extending bores 21 which receive a hinge pin 22, and which define therebetween a first series of spaces. The leading portion 15 of the first link module 13 is generally identical to the leading portion of a second link module 23 which will now be described.

The second link module 23 extends transversely of the intended direction of conveyor travel and includes a trailing portion 27 which is generally identical to the trailing portion 17 of the first link module 13. In addition, the second link module 23 also includes a leading portion 25 including a plurality of spaced apart ears 29 which are located in the spaces defined by the plurality of ears 19 of the trailing portion 17 of the first link module 13 and which respectively include therein transversely extending bores 31 which receive the hinge pin 22.

The before mentioned hinge pin 22 extends in the bores 21 and 31 of the first and second link modules 13 and 23 and has a length less than the full transverse width of the conveyor 11 and is centered relative to the width of the conveyor 11. The hinge pins 22 can be of any suitable construction.

At both outer sides, the link modules 13 and 23 also respectively include outer side ears 35 respectively including the bores 21 and 31, as well as respective retention plugs or pins 41 which serve to retain the hinge pin(s) 22 in the centered position and which can also be readily detached and removed from the conveyor 11 to permit access to the hinge pin(s) 22. In addition, the link modules 13 and 23 and the retention plugs or pins 41 also include interengaging surfaces on the retention plugs or pins and on the outer side ears for releasably preventing outward withdrawal of the retention plugs or pins 41 from the bores 21 and 31.

More particularly in this last regard, each of the outer side ears 35 has an outer side surface 45 extending along the direction of intended conveyor travel, and an associated one of the bores 21 and 31 extending from the outer side surface 45 transversely of the direction of intended conveyor travel and in axial alignment with the bores 21 and 31 in the other ears 19 and 29. Still more particularly, while other constructions can be employed, each of the outer side surfaces 45 include a recess 47 extending radially from the associated one of the bores 21 and 31 along the direction of intended conveyor travel, and defined, in part, by a recessed surface 49 extending radially from the associated one of the bores 21 and 31 and parallel to the outer side surface 45 and having an end 51 spaced from the associated one of the bores 21 and 31.

In addition, each of the outer side ears 35 includes an edge surface 53 extending from the end of the recessed surface 49 and parallel to the associated one of the bores 21 and 31, together with a first gripping surface 55 extending parallel to the recessed surface 49 and from the edge surface 53 toward the associated one of the bores 21 and 31 to define, with the recessed surface 49 and the edge surface 53, a first gripping portion 57 extending or projecting away from the associated one of the bores 21 and 31 and in generally aligned relation along the direction of intended conveyor travel with the first gripping portion 57.

Still further in addition, each of the outer side ears 35 includes an aperture 63 which extends between the top and bottom of the associated outer side ear 35, which extends transversely to the associated one of the bores 21 and 31, which communicates with the associated one of the bores 21 and 31, and which is defined, in part, by a second gripping surface 65 spaced inwardly from and parallel to the associated outer side surface 45. The second gripping surface 65 defines, together with the recessed surface 49, a second gripping portion 67 facing or projecting toward the associated one of the bores 21 and 31.

The retention plugs 41 at each side of the conveyor 11 are both of identical construction and respectively include a cylindrical barrel portion 71 extending in the bores 21 and 31 and including an outer end 73. In addition, each of the retention plugs 41 includes a flange portion 75 which extends from the outer end 73 of the barrel portion 71, which is located in the recess 47 in the outer side surface 45, and which includes an outer end or outer part or tab 77 which is spaced from the barrel portion 71 and which is accessible by an operator for manipulation to detach the retention plug 41 from the associated outer side ear 35.

Still further in addition, each of the retention plugs 41 includes a cantilevered arm portion 81 which extends from the flange portion 75 inwardly of the outer end or tab 77 thereof and in parallel relation to the barrel portion 71 and which includes an outer enlarged portion or barb 83 projecting toward the barrel portion 71 and including an edge 85 extending in generally parallel relation to the flange portion 75 and a ramp surface 87 extending from the edge 85 and in outwardly diverging relation to the axis of the barrel portion 71. The edge 85 defines, with the facing surface of the flange portion 75, a first notch 91 resiliently engaging the first gripping portion 57 of the outer side ear 35.

In other words, the arm portion 81 and the outer enlarged portion or barb 83 provide a cantilevered snap engagement or fit with the first gripping surface 55 of the link module. More specifically, upon insertion, the enlarged portion or barb 83 is forced around the first gripping surface 55 because the flange portion 75 is resilient and bends to accommodate the cantilevered snap engagement or fit.

Still further in addition, each of the retention plugs 41 includes a tab or barb portion 95 which extends radially from the barrel portion 71 in inwardly spaced relation from the flange portion 75 and which includes an edge 97 extending in generally parallel relation to the flange portion 75, and a ramp surface 99 extending from the edge 97 away from the flange portion 75 and in converging inclined relation to the axis of the barrel portion 71 and in outwardly diverging relation with respect to the ramp surface 87 of the enlarged portion 83. The edge 97 defines, with the facing surface of the flange portion 75, a second notch 101 facilitating resilient or snap fit engagement of the tab or barb portion 95 with the second gripping portion 67 of the outer ear 35.

If desired, the retention plug 41 can include only the tab portion 95 and omit the enlarged portion or barb 83, whereby the retention plug 41 is retained only by engagement of the gripping surface 65 of the gripping portion 67 with the tab or barb portion 95. Advantageously, the interengaging surfaces on the enlarged portion or barb 83 of the retention plug 41 and on the outer side ears 35 of the link modules 13 and 23 prevent the retention plug 41 from being excessively inserted into the bore 21 and facilitate or permit the use of a tool, if desired, to assist in disassembly of the retention plug from the bore 21.

Alternatively, if desired, the retention plug 41 can omit the tab portion 95 and can include only the flange portion 75, the arm portion 81, and the enlarged portion or barb 83, whereby the retention plug 41 is retained only by engagement of the gripping surface 55 of the gripping portion 57 with the enlarged portion or barb 83.

Any suitable material can be employed to fabricate the link modules 13 and 23, such as for instance, from plastic materials having good snap fit qualities, such as polypropylene, polybutylene, or polybutylene terephthalate, or polyethylene, or nylon. The material should be sufficiently resilient to facilitate the snap fitting engagements but, at the same time, sufficiently rigid so that the bore 21 does not permanently deform during assembly and disassembly. In the particularly disclosed construction, the link modules 13 and 23 are fabricated from acetal plastic.

The retention plugs 41 can be fabricated from any suitable material, such as several engineering thermoplastics, poloefins, or even from metal. The material should be sufficiently resilient to facilitate the snap fitting engagements but, at the same time, sufficiently rigid so that the enlarged portion or barb 83 and the tab portion or barb 95 do not permanently deform during assembly and disassembly. The same material can be employed for both the link modules 13 and 23 and the insertion plugs 41. In the particularly disclosed construction, the retention plugs 41 are fabricated from plastic material and, in particular, from polybutylene terephthalate.

In operation, the retention plugs 41 at the opposite sides of the conveyor 11 serve to restrain the hinge pin 22 from axial movement, or, in the absence of the hinge pin 22, serve the function of the hinge pin 22. Furthermore, the retention plugs 41 are detachable from the outer end ears 35 to gain access to the hinge pin 22 by manipulation of the outer end or tab 77 of the flange portion 75 to lift or dislodge the outer end 77 from the recess 47, which dislodgement serves, if only one of the tab portion 95 and the enlarged portion 83 are employed, to disengage the snap fit between the edge 85 or 97 from the associated gripping surface 55 and 65 or, when both the tab portion 95 and the enlarged portion 83 are employed, to disengage the snap fit between the edges 85 and 97 from the associated gripping surfaces 55 and 65.

More particularly, during the insertion of the retention plug 41 into the bore 21, the tab or barb portion 95 creates, between the tab or barb portion 95 and the bore 21, a press fit which, after full assembly of the retention plug 41 into the bore 21, is released, with the result that the tab or barb portion 95 engages the gripping surface 65 to provide the desired snap fit. During the insertion and withdrawal of the retention plug 41 from the bore 21, one or both of these components is resiliently deformed to provide for the press fit passage of the retention plug 41 through the bore 21 and into snap fit engagement with the gripping surface 65 of the associated link module 13 and 23. More particularly, the bore 21 in the link modules 13 and 23 can resiliently enlarge or stretch. In addition, the plastic material of the retention plug 41 can resiliently deform or flow sufficiently to permit the passage of the tab or barb portion 91 through the bore 21. After such passage, the bore 21 and the tab or barb portion 95, as applicable, return to their non-stressed or normal condition and the tab or barb portion 95 enters into the snap fit engagement with the gripping surface 65.

Shown in FIG. 5 tab or barb portion 95 and the bore 21 of the link modules 13 and 23 is actually a snap fit is another embodiment of a retention plug 141 which is constructed in like manner to the retention plug 41 shown in FIG. 4, except that the arm portion 81 is omitted and the flange portion 75 is shortened so that the length thereof is less than the length of the recess 47. Desirably, one of the retention plugs 141 is located in each of the bores 21 and 31 at each of the side surfaces 45 of the link modules 13 and 23. One of the retention plugs 141 is shown in releasable assembled relation with the link module 13. Accordingly, the retention plug 141 will riot be further described.

In the construction shown in FIG. 6, as in the construction shown in FIGS. 1 through 4, the barrel portion 71 of the retention plug 141 extends in the bore 21 of the link module 13 and, as illustrated in FIG. 6, the flange portion 75 of the retention plug 141 extends in the recess 47 of the outer side surface 45.

The disclosed link module and retention plug assembly or conveyor 11 is particularly well suited for retaining a hinge pin in a MatTop® style conveyor chain or modular belting manufactured by Rexnord Corporation. For relatively small width conveyor chains, the retention plugs 41 can also function as a hinge pin, thereby replacing the hinge pin 22. Thus the disclosed retention plugs 41 can be used in conjunction with any width conveyor belt or chain, and, in connection with smaller width chains, the disclosed retention plugs 41 can be used to replace the usual hinge pin.

The disclosed link module and retention plug assembly or conveyor 11 also advantageously affords removal of the retention plugs 41 from the associated one of the link modules 13 and 23 by inclusion of the outer end or tab 77 which facilitates disassembly.

A particularly desirable feature of the disclosed link module and plug assembly or conveyor 11 is that the barrel portions 71 of the retention plugs 41 are not limited in length and thus, as indicated above, the disclosed retention plugs 41 can also serve as a hinge pin.

Another particularly desirable feature of the disclosed link module and plug assembly or conveyor 11 is the inclusion of the ramp surfaces 87 and 99 which facilitate ease of assembly and, when the retention plugs 41 are fully inserted, the locking edges 85 and 97 releasably lock to the associated one of the link modules 13 and 23.

In addition, still another desirable feature of the disclosed link module and plug assembly or conveyor 11, is that the flange portion 75 also provides the function of a stop which, once the retention plug 41 is inserted, prevents further insertion.

The disclosed link module and plug assembly or conveyor 11 advantageously also provides for ease of assembly and cleanability. In addition, the disclosed link module and plug assembly or conveyor 11 is also of relatively large size which has more field acceptance in food processing factories because of the reduced chance that such a larger size retention plug will be unexpectedly mixed in with packaged food products.

Various of the features are set forth in the following claims.

We claim:

1. A conveyor having an intended direction of travel comprising: a first link module extending transversely of the intended direction of conveyor travel and including a trailing portion, said trailing portion including a plurality of spaced apart ears defining therebetween a first series of spaces; a second link module extending transversely of the intended direction of conveyor travel, said second link module including a leading portion including a plurality of spaced apart ears located in said spaces defined by said plurality of ears of said trailing portion of said first link module, wherein one of said leading and trailing plurality of ears includes a laterally located outer side ear having an outer side surface extending along the direction of intended conveyor travel, said outer side ear includes a bore extending from said outer side surface transversely of the direction of intended conveyor travel; a retention plug including a cylindrical barrel portion extending in said bore, said retention plug including an outer end and inter-engaging surfaces, said inter-engaging surfaces releasably preventing outward withdrawal of said retention plug from said bore; and wherein said outer side surface includes an elongated recess extending from said bore in the direction of intended conveyor travel and said retention plug includes a flange portion extending from said outer end of said barrel portion in said elongated recess.

2. A conveyor in accordance with claim 1 wherein said leading and trailing pluralities of ears respectively include bores in axial alignment with said bore in said end ear, and wherein said barrel portion extends in a plurality of said bores of said leading and trailing pluralities of ears.

3. A conveyor in accordance with claim 1 wherein said first and second link modules are fabricated from plastic.

4. A conveyor in accordance with claim 1 wherein said plug is fabricated from plastic.

5. A conveyor in accordance with claim 1 wherein said first and second link modules and said plug are fabricated from plastic.

6. A conveyor having an intended direction of travel comprising: a link module extending transversely of the intended direction of conveyor travel, said link module including a plurality of ears, wherein one of said plurality of ears is a laterally located outer side ear having an outer side surface, said outer side ear including a bore extending from said outer side surface transversely of the direction of intended conveyor travel and a first gripping surface in communication with said bore, said first gripping surface extends along the direction of intended conveyor travel, wherein said outer side ear also includes a second gripping surface in spaced parallel relation to said first gripping surface, said second gripping surface is positioned along the same direction of intended conveyor travel as said first gripping surface; and a retention plug fabricated of resilient material, said retention plug including a cylindrical barrel portion extending in said bore, wherein said retention plug also includes a pair of spaced surfaces engaging said first gripping surface and said second gripping surface.

7. A conveyor having an intended direction of travel comprising: a first link module extending transversely of the intended direction of conveyor travel and including a trailing portion, said trailing portion including a plurality of ears spaced apart at distances to define therebetween a first series of spaces; a second link module extending transversely of the intended direction of conveyor travel, said second link module including a leading portion having a plurality of ears spaced apart at distances to define therebetween a second series of spaces, said plurality of ears on said second link module are located in said spaces defined by said plurality of ears of said trailing portion of said first link module, wherein one of said leading and trailing plurality of ears includes a laterally located outer side ear having an outer side surface extending along the direction of intended conveyor travel, said outer side ear includes a bore extending from said outer side surface transversely of the direction of intended conveyor travel and an elongated recess located in said outer side surface and extending radially from said bore along the direction of intended conveyor travel, said outer side ear also includes an aperture extending in said outer side ear transversely to said bore, said aperture communicates with said bore and is defined, in part, by an abutment surface spaced inwardly from said outer side surface, said abutment surface extends along the direction of intended conveyor travel; a retention plug including a cylindrical barrel portion extending in said bore, said retention plug includes an outer end and a flange portion extending from said outer end, said flange portion is located in said elongated recess; and wherein said retention plug also includes a resilient tab portion extending radially from said barrel portion in inwardly spaced relation from of said flange portion, said resilient tab portion is in engagement with said abutment surface of said outer side ear.

8. A conveyor in accordance with claim 7 wherein said leading and trailing pluralities of ears respectively include bores in axial alignment with said bore in said end ear, and wherein said barrel portion extends in a plurality of said bores of said leading and trailing pluralities of ears.

9. A conveyor in accordance with claim 7 wherein said first and second link modules are fabricated from plastic.

10. A conveyor in accordance with claim 7 wherein said plug is fabricated from plastic.

11. A conveyor in accordance with claim 7 wherein said first and second link modules and said plug are fabricated from plastic.

12. A conveyor in accordance with claim 7 wherein said flange portion includes an outer end which is manipulatable to facilitate removal of said retention plug from said link module.

13. A conveyor having an intended direction of travel comprising: a first link module extending transversely of the intended direction of conveyor travel and including a trailing portion, said trailing portion including a plurality of ears spaced apart at distances to define therebetween a first series of spaces; a second link module extending transversely of the intended direction of conveyor travel, said second link module including a leading portion including a plurality of ears spaced apart at distances to define therebetween a second series of spaces, said plurality of ears on said second link module are located in said spaces defined by said plurality of ears of said trailing portion of said first link module, wherein one of said leading and trailing plurality of ears includes a laterally located outer side ear having an outer side surface extending along the direction of intended conveyor travel, said outer side car includes a bore extending from said outer side surface transversely of the direction of intended conveyor travel and an elongated recess located in said outer side surface, said elongated recess extends radially from said bore along the direction of intended conveyor travel and is defined, in part, by a recessed surface extending radially from said bore parallel to said outer side surface, said recessed surface includes an end spaced from said bore, wherein said outer side ear also includes an edge surface extending from said end of said recessed surface parallel to said bore and a gripping surface extending parallel to said recessed surface from said edge surface to define with said recessed surface and said edge surface a gripping portion; and a retention plug including a cylindrical barrel portion extending in said bore, said retention plug includes an outer end and a flange portion extending from said outer end, said flange portion is located in said elongated recess and includes an arm portion extending inwardly from said flange portion in parallel relation to said barrel portion, wherein said retention plug also includes an outer enlarged portion projecting toward said barrel portion such that said flange portion, said arm portion and said outer enlarged portion form a notch resiliently engaging said gripping portion of said outer side ear.

14. A conveyor in accordance with claim 13 wherein said leading and trailing pluralities of ears respectively include bores in axial alignment with said bore in said end ear, and wherein said barrel portion extends in a plurality of said bores of said leading and trailing pluralities of ears.

15. A conveyor in accordance with claim 13 wherein said first and second link modules are fabricated from plastic.

16. A conveyor in accordance with claim 13 wherein said plug is fabricated from plastic.

17. A conveyor in accordance with claim 13 wherein said first and second link modules and said plug are fabricated from plastic.

18. A conveyor in accordance with claim 13 wherein said flange portion includes an outer end which is manipulatable to facilitate removal of said retention plug from said link module.

19. A conveyor having an intended direction of travel comprising: a first link module extending transversely of the intended direction of conveyor travel and including a trailing portion, said trailing portion including a plurality of ears spaced apart at distances to define therebetween a first series of spaces; a second link module extending transversely of the intended direction of conveyor travel, said second link module including a leading portion including a plurality of ears spaced apart at distances to define therebetween a second series of spaces, said plurality of ears on said second module are located in said spaces defined by said plurality of ears of said trailing portion of said first link module, wherein one of said leading and trailing plurality of ears includes a laterally located outer side ear having an outer side surface extending along the direction of intended conveyor travel, said outer side ear includes a bore extending from said outer side surface transversely of the direction of intended conveyor travel and an elongated recess located in said outer side surface, said elongated recess extends radially from said bore along the direction of intended conveyor travel and is defined, in part, by a recessed surface extending radially from said bore parallel to said outer side surface, said elongated recess includes an end spaced from said bore, said outer side ear also includes an edge surface extending from said end of said recessed surface parallel to said bore and a first gripping surface extending parallel to said recessed surface from said edge surface to define with said recessed surface and said edge surface a gripping portion, wherein said outer side ear also includes an aperture extending in said outer side ear transversely to said bore, said aperture communicates with said bore and is defined, in part, by a second gripping surface spaced inwardly from, and parallel to, said outer side surface to define with said recessed surface a second gripping portion; and a retention plug including a cylindrical barrel portion extending in said bore, said retention plug includes an outer end and a flange portion extending from said outer end, said flange portion is located in said elongated recess and includes an outer end spaced from said barrel portion, said retention plug also includes an arm portion extending inwardly from said outer end of said flange portion in parallel relation to said barrel portion, wherein said retention plug also includes an outer enlarged portion projecting toward said barrel portion said outer enlarged portion defining with said flange portion and said arm portion a first notch, said first notch resiliently engaging said first gripping portion of said outer side ear, wherein said retention plug also includes a tab portion extending radially from said barrel portion, said tab portion is in inwardly spaced relation from said flange portion, said tab portion defining with said flange portion and said cylindrical barrel portion a second notch, said second notch resiliently engaging said second gripping portion of said outer ear.

20. A conveyor in accordance with claim 19 wherein said tab portion includes a side surface facing said arm portion and normally extending in inclined relation to said flange portion, wherein said enlarged portion includes a side surface facing said barrel portion and normally extending in inclined relation to said flange portion, and wherein said side surfaces of said tab portion and said enlarged portion extend in outwardly divergent relation from said flange portion.

21. A conveyor in accordance with claim 19 wherein said leading and trailing pluralities of ears respectively include bores in axial alignment with said bore in said end ear, and wherein said barrel portion extends in a plurality of said bores of said leading and trailing pluralities of ears.

22. A conveyor in accordance with claim 19 wherein said first and second link modules and said plug are fabricated from plastic.

23. A conveyor in accordance with claim 19 wherein said flange portion includes an outer end which is manipulatable to facilitate removal of said retention plug from said link module.

* * * * *

UNITED STATES PATENT AND TRADEMARK OFFICE
CERTIFICATE OF CORRECTION

PATENT NO. : 5,960,937
DATED : October 5, 1999
INVENTOR(S) : James C. Stebnicki et al.

It is certified that error appears in the above-identified patent and that said Letters Patent is hereby corrected as shown below:

Column 7, line 5, after "will" "riot" should be --not--.

Column 9, line 8, after "relation from" "of" should be deleted.

Signed and Sealed this

Thirteenth Day of February, 2001

Attest:

NICHOLAS P. GODICI

Attesting Officer

Acting Director of the United States Patent and Trademark Office